United States Patent [19]

Slachta et al.

[11] Patent Number: 4,953,877
[45] Date of Patent: Sep. 4, 1990

[54] FLUID ACTUATED CHUCK

[76] Inventors: Gene Slachta, 494 E. Morley, Saginaw, Mich. 48601; Kim F. Stemler, 744 Basloms, Saginaw, Mich. 48603

[21] Appl. No.: 248,045

[22] Filed: Sep. 23, 1988

[51] Int. Cl.$^5$ ............................................. B23B 31/40
[52] U.S. Cl. ..................................... 279/2 A; 242/72 B; 269/22
[58] Field of Search ............... 279/2 R, 46, 2 A, 4, 279/1 D; 269/22, 48.1, 257; 242/72–73; 166/212

[56] References Cited

U.S. PATENT DOCUMENTS

| | | | |
|---|---|---|---|
| 2,012,826 | 8/1935 | Montgomery | 279/46 |
| 2,534,527 | 12/1950 | Myers | 279/4 |
| 2,753,388 | 7/1956 | Bjerkas | 279/2 |
| 2,826,420 | 3/1958 | Klingler | 279/4 |
| 2,901,013 | 8/1959 | Freeman | 269/22 |
| 3,010,568 | 11/1961 | Annegarn | 72/290 |
| 3,144,064 | 8/1964 | Polk, Jr. | 269/22 |
| 3,176,439 | 4/1965 | Gabriel et al. | 51/237 R |
| 3,542,354 | 11/1970 | Fitzpatrick | 269/287 X |
| 3,606,968 | 9/1971 | Loyd | 279/41 X |
| 3,608,161 | 9/1971 | Kost et al. | 24/463 |
| 3,677,559 | 7/1972 | Andre et al. | 279/1 Q |
| 3,751,050 | 8/1973 | Hayes et al. | 279/4 |
| 3,852,018 | 12/1974 | Holme | 269/287 X |
| 4,200,301 | 4/1980 | Ryan | 279/2 A |
| 4,317,577 | 3/1982 | Cameron | 279/2 A |
| 4,422,653 | 12/1983 | Piotrowski | 279/1 Q X |
| 4,580,796 | 4/1986 | Baur et al. | 279/4 |
| 4,669,226 | 6/1987 | Mandler | 279/1 D X |
| 4,755,981 | 7/1988 | Ekhoff | 279/2 A X |

FOREIGN PATENT DOCUMENTS

| | | | |
|---|---|---|---|
| 3320068 | 12/1984 | Fed. Rep. of Germany | 279/4 |
| 680816 | 8/1979 | U.S.S.R. | 279/4 |
| 567170 | of 1945 | United Kingdom | 279/41 |
| 1437497 | 5/1976 | United Kingdom | 279/2 A |

Primary Examiner—Z. R. Bilinsky
Assistant Examiner—Robert Schultz
Attorney, Agent, or Firm—Learman & McCulloch

[57] ABSTRACT

A chuck for holding an easily distortable hollow workpiece has a rigid body with axially extending co-extensive, circumferentially spaced, flexible chuck fingers carried on a mounting surface. Each of the fingers has one end axially fixed to the mounting surface and an opposite free end which is swingable radially to grip a radially adjacent workpiece. An inflatable ring, mounted on the chuck body radially adjacent the fingers is in engagement with the fingers and, when the ring is inflated, moves the free ends of the fingers radially to grip the workpiece.

11 Claims, 1 Drawing Sheet

U.S. Patent  Sep. 4, 1990  4,953,877
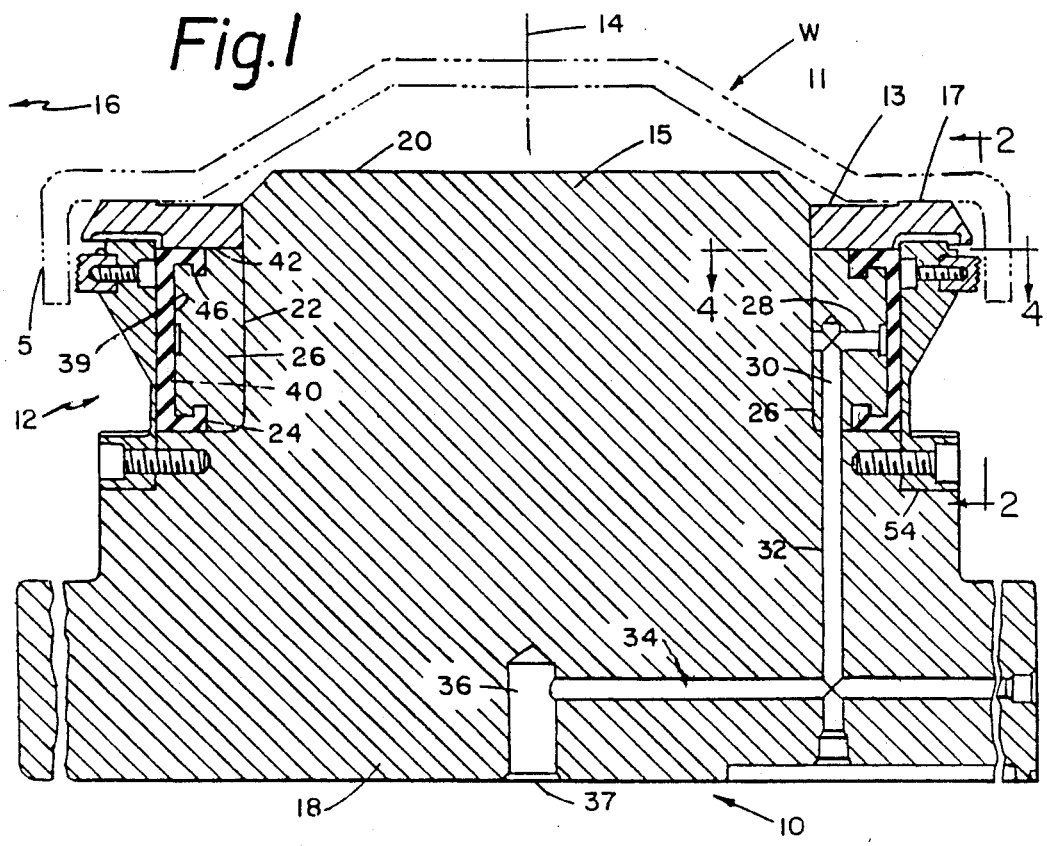
Fig.1
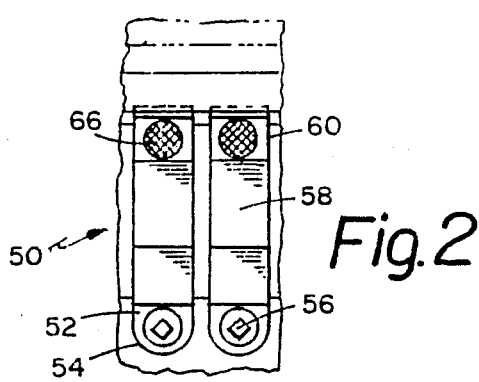
Fig.3
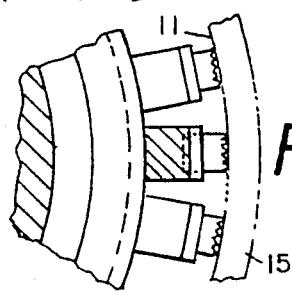
Fig.2
Fig.4

FLUID ACTUATED CHUCK

BACKGROUND OF THE INVENTION

1. Field of the Invention

This invention relates to a chuck for clamping and holding hollow bodies and more particularly to a fluid actuated holding device including a plurality of individual, annularly arranged, clamping fingers which have yieldably mounted terminal ends movable between inoperative positions and workpiece clamping position by a pliant, fluid actuated flexible annular ring.

2. Description of the Prior Art

Workpieces having a thin walled cylindrical or tubular surface to be machined are easily distortable and are frequently "out of round" on either or both of their outside diameter or their inside diameter. With one prior art type clamping device used to hold the workpiece during machining, the chuck is unable to adequately grip a hollow workpiece without distorting the workpiece. Such prior art holding devices typically comprise a diaphragm chuck having a mechanical sleeve in combination with a pliant sleeve to clamp the part. In one such prior art device, disclosed in U.S. Pat. No. 3,542,354 issued to Paul Fitzpatrick on or about Nov. 24, 1970, as the sleeve engages the workpiece, the workpiece would distort. The pressure which must be exerted in the prior art clamping devices, such as disclosed in the Fitzpatrick patent, to adequately flex the diaphragm chuck is so great that the "full wrapped sleeve" disclosed therein, cannot adequately grip the workpiece without concurrently distorting the workpiece.

Accordingly, in one instance, the outside diameter and/or the inside diameter" of the prior art clamped workpiece is "out of round" when it is being clamped and machined. Although the outside diameter of the hollow workpiece, which is chucked on its internal diameter surface, is machined perfectly round, when the clamping pressure is released, the distorted part contracts or retracts to its original shape and thus the outside diameter is out of round.

Accordingly, it is an object of the present invention to provide a new and novel chuck which clamps without distorting hollow parts having a thin cylindrical wall.

It is another object of the present invention to provide a chuck for holding workpieces, which may have an eccentric workpiece holding surface, without distorting the workpiece.

The U.S. Pat. No. 3,608,161, issued to E. Kost, et al on Sept. 28, 1971 and the U.S. Pat. No. 3,542,354 issued to Paul Fitzpatrick on Nov. 24, 1970, each disclose another clamping system using both a pliant sleeve and a full wrap mechanical sleeve in combination to clamp a hollow part.

This type of prior art system has the necessary mechanical stiffness to resist the cutting forces which tend to move the workpiece, however, it is unable to conform to the outline of the part gripping surface without workpiece distortion at the required clamping pressures. Also, with this type prior art systems, the inherent stiffness of the full wrapped mechanical sleeve severely limits the sleeve excursion which in turn limits the part size variation which is clampable.

Another prior art system is of the type disclosed in U.S. Pat. No. 3,677,559 issued to Andre, et al on July 18, 1972. This prior art system utilizes only a pliant sleeve to hold a workpiece and the forces exerted tending to hold a workpiece are not sufficient to resist the radial and axially forces created by the cutting tools. This prior art system results in the part moving during machining. This, is obviously unacceptable. The movement can be reduced, but not totally eliminated, by increasing chucking pressure.

Also, in this last mentioned prior art system, it is difficult to control the axial position of the part. If the part is moved off its axial locating surface, the result is a loss of dimensional stability and clamping rigidity.

It is another object of the present invention to provide a new and novel holding device which significantly increases the radial and axial holding forces exerted on the workpiece.

It is another object of the present invention to provide a new and novel holding device of the type described which will improve locational accuracy for machining.

The following prior art patents are cited as being of interest:

| | | |
|---|---|---|
| 2,534,527 | Myers | Dec. 19, 1950 |
| 2,753,388 | Bjerkas | Jul. 3, 1956 |
| 2,901,013 | Freeman | Aug. 25, 1959 |
| 3,144,064 | Polk | Aug. 11, 1964 |
| 3,176,439 | Gabriel et al | Apr. 6, 1965 |
| 3,542,434 | Fitzpatrick | Nov. 24, 1970 |
| 3,608,161 | Kost et al | Sep. 28, 1971 |
| 3,677,559 | Andre et al | Jul. 18, 1972 |
| 3,751,050 | Hayes et al | Aug. 7, 1973 |
| 4,422,653 | Piotrowski | Dec. 27, 1983 |

Briefly, the U.S. Pat. No. 2,534,527 is an older basic showing while the Hayes Pat. No. 3,751,050, discloses a chuck provided with a plurality of separate annular elastomeric gooves which are inflated through various ports.

Also briefly, the Freeman Pat. No. 2,901,013, is of interest in illustrating an internal expansible bladder tube which grips a fruit workpiece to be externally peeled. The remaining patents likewisely do not disclose or remotely suggest Applicants' construction.

It is yet another object of the present invention to provide a new and novel chuck which can grip a part which is out of round without distorting the part but yet exerting sufficient clamping pressure thereon to hold the part during machining.

It is still another object of the present invention to provide a new and novel chuck of the type described including a plurality of individual, independently movable, flexible fingers which can grip a part which is out of round without distorting the part.

Still another object of the present invention to provide a new and novel chuck of the type described which includes a plurality of individual, independently movable, flexible fingers, which include a portion that swings radially and axially to exert radial and axial clamping forces on the workpiece.

A further object of the present invention to provide a fluid actuated chuck of the type described including an inflatable ring which actuates a plurality of circumferentially disposed, individually movable, independent flexible fingers which are fixed at one end and include a flexible free end which is radially moved by the ring, when inflated, to grip the part.

A still further object of the present invention is to provide a holding device of the type described which includes individual fingers which are flexible to allow the chucking fingers to conform to the part without distorting the part.

Other objects and advantages of the present invention will become apparent to those of ordinary skill in the art as the description thereof proceeds.

SUMMARY OF THE INVENTION

A chuck for gripping and holding a thin-wall hollow workpiece which may be eccentric comprising: a support body having an axis; a plurality of generally axially extending, independently movable, chuck fingers mounted on the body concentrically about the axis; each of the fingers including a free end portion which is freely swingably movable relative to the adjacent finger end portion between an inoperative position and an axially and radially displaced clamping position in intimate clamping engagement with the workpiece; and mechanism on the body for moving the free ends of the fingers between the inoperative positions and the clamping positions.

BRIEF DESCRIPTION OF THE DRAWINGS

The invention may be more readily understood by referring to the accompanying drawings, in which:

FIG. 1 is a sectional front elevational view of a hydromechanical holding device constructed according to the present invention;

FIG. 2 is a side elevational sectional view, taken along the line 2—2 of FIG. 1, illustrating a typical chuck finger;

FIG. 3 is an enlarged front sectional view, similar to FIG. 1 more particularly illustrating a portion of the resilient ring and one of the clamping fingers; and FIG. 4 is a top plan sectional view, taken along the line 4—4 of FIG. 1.

DESCRIPTION OF THE PREFERRED EMBODIMENT

A fluid actuated chuck, constructed according to the present invention, generally designated 10, is particularly adapted for use in gripping and holding a hollow thin walled workpiece, generally designated W, having a thin generally cylindrical side wall 12 which may be eccentric relative to its axis 14 and is easily distortable upon radial pressure being exerted radially outwardly in the direction of the arrow 16. The workpiece W includes a radially inner chucking surface 11 and a radially outer surface 15 to be machined.

The chuck 12 includes a central support body 18 which can either be stationarily mounted or mounted for rotation about the axis 14 by a suitable spindle, not shown. The axially outer portion 20 of the central support body 18 includes a substantially reduced diameter, axially extending, cylindrical mounting surface 22 and a radially extending annular ledge 24 for receiving a sleeve mounting ring collar 26. Internal fluid passages 28, 30 are provided in collar 26 in fluid communication with fluid passages 32, 34, and 36 provided in the support body 18.

An annular workpiece mounting ring or mount pad device 13 is fixed to the terminal end 15 of cylindrical mounting surface 22 and includes a plurality of circumferentially spaced, arcuate, integral workpiece mounting projections 17 thereon.

Mounted on the outer circumference 27 of annular collar 26 is an annular, pliant or resilient expansible ring, generally designated 40, having a generally C-shaped cross-section with distal ends 42 being received in upper and lower annular slots 46 provided in the collar 26. The distal ring ends 42 seal to the walls of slots 46 to provide an air-tight seal therebetween. The elastomeric membrane 39, may be of any type of composite yieldable materials used and may suitably comprise rubber.

As illustrated in the drawing, the passage 28 is aligned with the outer cylindrical surface 27 of collar 26 to admit fluid to the inner surface 39 of ring 40. When hydraulic or pneumatic fluid is admitted from a source 37 to the inside surface 39 of ring 40, via passages 28, 30, 32, 34, 36, the ring 39 moves from the inoperative position, illustrated in FIG. 1, to the operative position, illustrated in FIG. 1, to the expanded, clamping position, illustrated in FIG. 3, for a purpose to be immediately described.

Mounted radially outwardly of the elastomeric member 40 are a plurality of circumferentially disposed individual, independently mounted, part gripping fingers, generally designated 50. Each of the fingers 50, which is typically manufactured of steel, includes an axially inner end 52 which is received in a complimentally shaped cutout 54 provided in the body 18. A bolt 56 fixes each inner end 52 in cutout 54.

As illustrated, the circumferentially arranged cutouts 54 are disposed axially inwardly but radially outwardly of the annular ledge 24. Each part gripping finger 50 includes an axially extending intermediate membrane 58 which has a substantially reduced radial thickness and a terminal free end 60 which is of substantially increased radial thickness. The free end 60 includes a bore 62 which is counterbored at 70, in the radially outer face 64, for receiving a mounting pad 66 which is coupled thereto via a suitable mounting bolt 68.

The axially inner face of the workpiece mounting ring 17 includes an annular recess 74 which receives the terminal ends 76 of the fingers 50.

The intermediate steel strap 58 normally urges the terminal end 60 to be in axial alignment with the fixed inner end 52 but allows said free end 60 to radially and axially swing to the position illustrated in FIG. 3.

THE OPERATION

In operation, a workpiece W is mounted on the workpiece support ring 17 as illustrated in FIG. 1 with the various chucking pads 66 radially removed from the inner workpiece surface 11, as illustrated in FIG. 1.

Pressurized fluid is admitted to the inner surface 39 of ring 40 from the source 37 through passages 28, 30, 32, 34, and 36 to force the pliant member ring 40 from the rest position, illustrated in FIG. 1, to the expanded gripping position, illustrated in FIG. 3.

When the ring 40 moves to the operative clamping position illustrated in FIG. 3, the ring 40 will force the free finger ends 60 to flex and swing relative to each other and to the fixed ends 52. The individual free ends 60 move radially outwardly and axially downwardly from the positions, illustrated in FIG. 1, to the clamping positions illustrated in FIG. 3.

The outward movement of the free finger ends 60 thus both exerts a radially outward clamping force, represented by the arrow 77, and an axially downwardly force, represented by the arrow 78, to "pull down" the workpiece W, establishing axial location and add additional clamping force which resists movement by machining forces which will thereafter be exerted on the outer surface 5 of the work piece.

Because the fingers 50 are independently mounted and are independently movable relative to each other, the fingers 50 independently transfer the expanding force from the flexible annular ring 40 to the workpiece W. This independent finger movement, along with the flexibility of the annular ring, allows clamping eccentric, out-of-round workpieces W without distortion of same.

If the workpiece W is out of round or eccentric, the fingers will not remove the distortion but will allow the workpiece W to remain in its eccentric position as it is being turned. Accordingly, when the clamping pressure is removed, the outside diameter will remain in the perfectly round or circular condition of which it was machined.

When the part is machined, fluid pressure is removed from the ring 40 which collapses allowing the yieldable steel strap 58 to return the free finger ends 60 to the inoperative positions illustrated in FIG. 1.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. A chuck for holding and gripping a thin, easily distortable hollow workpiece having a peripheral wall radially adjacent to said chuck to be gripped comprising:
   a. a rigid chuck body having an axis and a cylindrical mounting surface concentric with said axis;
   b. a plurality of generally axially extending, generally co-extensive, discrete flexible chuck fingers circumferentially spaced from one another throughout their length;
   c. means individually removably axially fixing one end of each finger on said mounting surface, each of said fingers having an opposite free end spaced axially from said mounting surface and swingable radially relative to said axially fixed end to radially grip said peripheral wall of a radially adjacent workpiece;
   d. an inflatable pliant ring concentrically mounted axially fixedly on said chuck body radially between said body and fingers radially adjacent and in operative engagement with portions of said fingers spaced from said axially fixed ends; and
   e. means for inflating said ring with fluid under pressure to expand it to move said free ends of the fingers individually radially to grip said workpiece, and for deflating said ring to permit said free ends to return radially to release said workpiece.

2. The chuck set forth in claim 1 wherein said ring comprises a resilient band mounted on said body to form a chamber around said body for receiving said fluid under pressure.

3. The chuck set forth in claim 1 wherein said fingers, between said fixed ends and said free ends, include portions of substantially less radial thickness relative to the radially fixed and free ends which permit radial deflection of the fingers upon said inflation of said ring.

4. The chuck set forth in claim 3 wherein each of said finger free ends has a workpiece engaging clamping pad.

5. The chuck set forth in claim 3 wherein said fingers are constructed of steel.

6. A chuck for holding and gripping a thin, easily distortable, hollow workpiece having a peripheral wall in telescoped relation with said chuck comprising:
   a. a rigid, generally cylindrical chuck body having an axis and a peripheral concentric mounting surface between its ends;
   b. a plurality of axially extending, co-extensive, circumferentially spaced, flexible, discrete workpiece-gripping fingers;
   c. a radially extending, workpiece-supporting mount pad device provided on said chuck body to support a workpiece having a radially extending portion connected with said peripheral wall;
   d. means individually removably axially fixing one end of each finger to said mounting surface, each of said fingers having an opposite free end spaced axially from said mounting surface, the opposite free ends of said fingers being individually deflectable radially relative to said axially fixed ends in an arcuate path to radially grip said peripheral wall of the workpiece and also draw said radially extending portion of the workpiece axially against said mount pad device;
   e. an inflatable resilient ring concentrically mounted axially fixedly on said chuck body radially between said body and fingers in operative engagement with portions of said fingers spaced from said axially fixed ends; and
   f. means for inflating said ring with fluid under pressure to expand it to move said free ends of the fingers radially to grip said workpiece and draw it axially against said mount pad device, and for deflating said ring to permit said free ends of the fingers to return radially inwardly to release said workpiece.

7. The chuck set forth in claim 6 wherein said ring comprises a resilient band having axially spaced edges mounted on said body to form a continuous sealed chamber around said body for receiving said fluid under pressure.

8. The chuck set forth in claim 7 wherein said chuck body has a peripheral surface with radially extending axially spaced peripheral grooves having axially enlarged radially inner portions spaced radially inwardly from the peripheral surface,
   said band edges being received within said radially extending grooves with axially extending flanges extending into said enlarged portions of the grooves.

9. The chuck set forth in claim 6 wherein said chuck fingers are identically dimensioned steel fingers.

10. The chuck set forth in claim 1 wherein said ring adapted to provide a cylindrical wall concentric with said axis when said ring is in deflated condition and said portions of said fingers have complementary axially extending walls in engagement therewith.

11. A chuck for holding and gripping a thin, easily distortable hollow workpiece having a peripheral wall at least partly surrounding said chuck comprising:
   a. a rigid, generally cylindrical chuck body having an axis and a peripheral concentric mounting surface between its ends;
   b. a plurality of axially extending, co-extensive, circumferentially spaced, flexible, discrete workpiece-gripping fingers, circumferentially spaced from one another throughout their length;
   c. a radially extending, workpiece-supporting mount pad device provided on said chuck body to support a workpiece having a radially extending portion in chuck body surrounding position connected with said peripheral wall;

d. means individually removably axially fixing one end of each finger to said surface, each of said fingers having an opposite free end spaced axially from said mounting surface, and each of the opposite free ends of said fingers being individually deflectable radially outwardly relative to said axially fixed end in an arcuate path to radially grip said peripheral wall of the workpiece and also draw said radially extending portion of the workpiece axially against said mount pad device;

e. an inflatable resilient ring concentrically mounted axially fixedly on said chuck body radially between said body and fingers in operative engagement with portions of said fingers spaced from said axially fixed ends; and f. means for inflating said ring with fluid under pressure which expands it radially against said fingers to move said free ends of the fingers radially outwardly to grip said workpiece and draw it axially against said mount pad device, and for deflating said ring to permit said free ends of the fingers to return radially inwardly to release said workpiece.

* * * * *